Patented Oct. 24, 1950

2,527,345

UNITED STATES PATENT OFFICE 2,527,345

PREPARATION OF ESTERS OF DICHLORO-SUCCINIC ACID

Jacob Osborn Ashcraft, Buffalo, N. Y., assignor to Allied Chemical and Dye Corporation, New York, N. Y., a corporation of New York No Drawing. Application September 18, 1948, Serial No. 50,010

17 Claims. (Cl. 260—485)

This invention relates to the production of esters of dichlorosuccinic acid and, more particularly, refers to a new and improved process for preparing lower dialkyl esters of 1.2 dichlorosuccinic acid by direct chlorination of the corresponding dialkyl maleates.

The lower dialkyl esters of 1.2 dichlorosuccinic acid, that is esters in which the alkyl groups each contain not more than 4 carbon atoms, e. g. dimethyl-, diethyl-, dipropyl-, dibutyl- and mixed esters such as methyl, ethyl dichlorosuccinates are characterized by high fungicidal activity. Such lower alkyl dicholorosuccinates, particularly dimethyldichlorosuccinate, are effective at exceedingly low concentrations as antimycotic constituents of wrappers for food. They function as inhibitors of mold growth in the food while the latter is enclosed in an ester-containing wrapper.

The preparation of dimethyl and diethyl esters by esterfication of dichlorosuccinic acid or its anhydride with the appropriate alcohol, or by reacting the silver salt of the acid with the appropriate alkyl halide, usually the iodide, has been suggested. These methods have been cumbersome or inefficient or both and to my knowledge have found no commercial application.

One object of the present invention is to provide an efficient method for the preparation of dialkyl esters of dichlorosuccinic acid by direct chlorination of the corresponding dialkyl maleates.

Another object of this invention is to provide an economical process for producing high yields of high quality dialkyl esters of dichlorosuccinic acid. A further object of the present invention is to provide an improved method for purifying the crude dialkyl ester of dichlorosuccinic acid product to obtain thereby a purified sucinate.

Other objects and advantages of the invention will be apparent from the following description.

In the course of my investigation I have attempted to produce dialkyl 1.2 dichlorosuccinates by direct chlorination of dialkylmaleates with chlorine at temperatures ranging from 50° C. to 90° C. under atmospheric and superatmospheric pressure. I have found that cholorination of the dialkylmaleates can thus be accomplished but when so effected the reaction is exceedingly slow and accompanied by increasing formation of dialkylfumarates which results from simultaneous isomerization of the dialkylmaleates. Presence of these fumarates in the reaction mixtures is objectionable for several reasons; for example, the fumarates chlorinate much less readily than maleates; they prolong the chlorination, and encourage side reactions which result in overchlorination and other undesired products. Formation of dimethylfumarate in the preparation of dimethyldichlorosuccinate is objectionable for the reason that the fumarate has a melting point of 102° C., which is near the boiling point of dimethyldichlorosuccinate at the reduced pressure, e. g. below 20 mm. of mercury, under which the ester is usually recovered by distillation from the reaction mass obtained by chlorinating dimethylmaleate. In such distillation, the fumarate sublimes with the distilling vapors and the sublimate tends to deposit in and clog pipes and lines of the distilling and connected systems.

Introduction of chlorine under pressure into an enclosed body of dialkylmaleates results in a very slow reaction which soon substantially ceases and apparently results in equilibrium in the vicinity of the interface of the upper chlorine atmosphere and the lower liquid charge.

Direct chlorination can be stimulated by actinic light. The addition of an adequate source of actinic light stimulation to large scale equipment adapted for the chlorination reaction, complicates the equipment and process by the physical limitations which are inherent in such an installation and imposes an inordinately long time-cycle upon the process. Production of dialkyldichlorosuccinates in commercial quantities by the use of actinic light results in manufacture of the esters at costs which are economically unattractive.

From the foregoing it will be evident that there are many difficulties involved in the chlorination of dialkylmaleates to dialkyldichlorosuccinates such as exceedingly slow reaction time, low yields due to incomplete conversion of the reactants and concomitant production of substantial quantities of by-products which generally are fumarates and overchlorinated and underchlorinated products.

Any method of chlorinating a dialkylmaleate to the corresponding dialkyldichlorosuccinate appears to be accompanied by more or less dehydrohalogenation which is aggravated by prolonging the chlorination. I have found that hydrogen chloride unavoidably formed during the reaction, if not removed from solution in the reaction mixture, tends to isomerize dialkylmaleate to the corresponding but undesirable fumarate.

I have discovered that excessive isomerization of the dialkylmaleates to dialkylfumarates may be avoided by passing a stream of chlorine through the dialkylmaleate at such a rate that a portion of the chlorine, preferably 5% to 10%, conducted into the chlorinated mass passes unreacted through the mass. While I do not wish to predicate my invention on any theory of mechanism, I believe the passage of chlorine through the reaction mass at a rate sufficiently high to effect passage of a portion of the chlorine therethrough unreacted, aids in disengaging and removing the hydrogen chloride from the reaction mass. Removal of the hydrogen chloride may be further facilitated by vigorously agitating the liquid mass.

I have also found that in the direct chlorination of lower dialkylmaleates to the corresponding dialkyldichlorosuccinates the tendency to form overchlorinated and other undesired products resulting from prolonged chlorination may be minimized by accelerating the reaction by the addition of a chlorinating catalyst to the liquid ester. Although the chlorinating catalysts have the common property of accelerating the reaction, I have found that certain specific chlorinating catalysts differ in their behavior in this reaction in other respects. For example, ferric chloride accelerates the chlorination but it also tends to accelerate dehydrohalogenation. Furthermore, in the absence of light as a synergistic medium, ferric chloride does not speed up the reaction sufficiently to avoid considerable isomerization of the maleate form of the ester to the fumarate.

In contrast with ferric chloride, phosphorous pentoxide accelerates the chlorination to an extent that the required period for adequate chlorination is about two-thirds of that required for a non-catalyzed chlorination. Sulfur and sulfur monochloride similarly reduce the chlorination period to about one-fifth of the time required for the non-catalyzed reaction. These three catalysts—phosphorous pentoxide, sulfur and sulfur monochloride—do not cause appreciable dehydrohalogenation nor stimulate isomerization of the maleate to the fumarate. Thus, they contribute to quicker and larger yields of dialkyldichlorosuccinates. They are the preferred catalysts for the improved process of my invention.

The crude dialkyldichlorosuccinate products formed by the aid of sulfur and sulfur monochloride as chlorination catalysts are characteristically yellow and malodorous. I have found that these objectionable odor and color characteristics may be eliminated by either of the following two procedures:

(1) The crude product is distilled and the malodorous distillate is mixed with a relatively small amount of powdered iron or copper, and the mixture is distilled in vacuo. A main fraction, which is water-white, free from malodor and which contains about 80% of all of the dialkyldichlorosuccinate in the reaction mass may be collected.

(2) The crude chlorinated mass is mixed with water containing sufficient weak alkali, such as an alkali-metal bicarbonate, to obtain finally an aqeuous faintly alkaline or neutral mixture. The oil is separated from the latter, washed with water until neutral to nitrazine yellow, and then distilled in vacuo to recover a fraction which is water-white, free from bad odor and which contains substantially all of the dialkyldichlorosuccinate formed.

In the operation of my process I have found that to avoid excess isomerization of dialkylmaleates to dialkylfumarates it is desirable to pass a stream of chlorine through the dialkylmaleate liquid at a sufficiently high rate such that a portion of the chlorine passes in unreacted state into and through the chlorinating mass. In practice I have found that 5% to 10% of the chlorine conducted into the reaction mixture and passing unreacted therethrough is sufficient to effectuate my purpose. The use of less than 5% may not always effectively remove the hydrogen chloride in the reaction mass; percentages greater than 10% unreacted chlorine passing through the mass are wasteful.

Chlorination may be conducted at temperatures from about 25° C. to about 125° C., preferably between 50° C. and 100° C. These operating temperatures may be maintained with relative ease and correlated with the conveniently controlled rate of chlorination to avoid overchlorination and dehydrohalogenation which are favored by temperatures above those in the preferred range.

Preferably the chlorination of the dialkylmaleates is continued until the amount of organically combined chlorine in the charge is between 95% and 110% of the amount which theoretically would be present if all the chlorinated charge were dialkyldichlorosuccinate. Amounts of combined chlorine below and above the preferred limits indicate the presence of undesirable material which not only reduces yield of desired dialkyldichlorosuccinate but also adds to the difficulties of separating the desired ester. The amount of catalyst used may be 0.1 to 1% or more by weight of the ester to be chlorinated. Excellent results have been obtained with an amount of catalyst within the range of ½ to 2%. Reasonable amounts above 2% are effective but unnecessary.

A chlorination of dialkylmaleate conducted with the aid of catalysts, as illustrated in the following examples, until organically combined chlorine in the mass is substantially the theoretical value for complete dichlorination of the charge usually results in a mixture which contains small but undesirable amounts of overchlorinated and underchlorinated material. The major portion of the desired dichlorinated product is separable from such under- and overchlorinated products by fractional distillation. The degree of purity of the separated fraction depends to a large extent upon carefulness of distillation. However, in general the presence of small amounts of underchlorinated and overchlorinated material in dialkyldichlorosuccinate has not been regarded as a serious detriment to use of the ester for commercial purposes, and for this reason a relatively simple distillation in vacuo permits the separation of a distillate fraction distilling within a relatively narrow temperature range which extends over about 5° to about 16° C. and includes the temperature at which dialkyldichlorosuccinate boils at the subatmospheric pressure at which the distillation is conducted. Such a fraction includes most of dialkyldichlorosuccinate of the crude product and relatively small amounts of underchlorinated and overchlorinated material, so that the recovered fraction contains an amount of organically combined chlorine which is about 1.5% more or less than the percent of organically combined chlorine contained in pure dialkyldichlorosuccinnate.

The following examples illustrate the invention. Quantities are parts by weight; temperatures are expressed in degrees centigrade.

*Example 1.*—400 parts dimethylmaleate and 4 parts phosphorous pentoxide were heated and agitated in a glass flask which was painted externally with a black coating to exclude light.

Chlorine was passed somewhat faster than it was absorbed into the agitated molten mass which was maintained during the chlorination at 70° to 75°. Approximately 10% of the chlorine introduced in contact with the dimethylmaleate passed unreacted through the mass. After 12½ hours a total of 192 parts chlorine (i. e. about 98% of the amount theoretically required to dichlorinate the dimethylmaleate charge) had combined chemically with the ester as shown by increase in weight of the ester charged. The chlorinated charge was distilled in vacuo and a fraction of the distillate, which distilled from 106° to 116° (mostly between 108° and 114°) at 10.9 mm. mercury absolute pressure, was separated. This fraction contained 31.7% organically combined chlorine and weighed 514 parts corresponding to 86% of the theoretically possible yield of dimethyldichlorosuccinate.

Example 2.—In this example sulfur was used as a catalyst. 400 parts dimethylmaleate and 4 parts sulfur were charged and reacted with chlorine in the manner of Example 1. At the end of 7¾ hours, the amount of organically combined chlorine in the product was 213 parts, corresponding to about 109% of the amount which theoretically would be present if the charge were pure dimethyldichlorosuccinate. The chlorinated mass was distilled in vacuo and a fraction of the distillate which boiled between 101° to 116° (mostly 107° to 110°) at 8.5 to 9.0 mm. mercury absolute pressure was collected separately. It contained 32.5% organically combined chlorine and weighed 461 parts corresponding to about 77% of the theoretically possible yield of dimethyldichlorosuccinate.

Example 3.—In this example sulfur monochloride was used as a catalyst. 400 parts of dimethylmaleate and 4 parts sulfur monochloride were chlorinated in the manner described in Example 1. After 7½ hours the chlorinated mass contained 212 parts of organically combined chlorine corresponding to about 108% of the amount which theoretically would be present if the charge were pure dimethyldichlorosuccinate. The chlorinated charge was distilled in vacuo, and a fraction of the distillation was collected separately. It boiled between 105° to 113° at 9 mm. mercury absolute pressure, contained 34% organically combined chlorine and weighed 428 parts, corresponding to 71.5% of the theoretically possible yield of dimethyldichlorosuccinate.

Example 4.—405 parts of yellow malodorous distillate, containing chiefly dimethyldichlorosuccinate prepared by a chlorination in the presence of sulfur and subsequent distillation in vacuo in the manner described in Example 2, was mixed with 3 parts of ground (60 mesh) iron and the mixture was distilled in vacuo at 10.5 to 11.1 mm. mercury absolute pressure. The distillate boiling between 104° to 114° (mostly between 108° and 112°) was collected separately. It was a water-white product with typical odor of pure dimethyldichlorosuccinate, and weighed 385 parts, corresponding to 95% recovery of the initial charge.

Example 5.—420 parts of yellow malodorous dimethyldichlorosuccinate made by chlorinating dimethylmaleate in the presence of sulfur, as in Example 2, was mixed with 3 parts of copper (better than 100 mesh) powder and distilled as in Example 4. The fraction boiling between 103° and 118° (mostly between 107° and 112°) at 10.5 to 11.8 mm. mercury absolute pressure, was collected separately. It was water-white and had the characteristic odor of dimethyldichlorosuccinate.

Example 6.—400 parts of dimethylmaleate mixed with 1 part sulfur was chlorinated in a manner described in Example 2 for 4½ hours when it contained an amount of organically combined chlorine corresponding to 103% of that which would be present if the product were dimethyldichlorosuccinate. The chlorinated mass weighing 592 parts was washed with a solution of 10 parts of sodium bicarbonate in 200 parts water, then with water until the wash was neutral to nitrazine yellow. 579 parts of the washed product were obtained and distilled in vacuo. The fraction which distilled between 110° to 126° at 9.5 to 10.5 mm. mercury absolute pressure was collected separately as dimethyldichlorosuccinate. The collected fraction was water-white and free from malodor. It contained 32.8% organically combined chlorine and weighed 469 parts, corresponding to about 79% of the theoretically possible yield of dimethyldichlorosuccinate.

Example 7.—400 parts of dimethylmaleate mixed with 1.5 parts of sulfur were chlorinated by gaseous chlorine for one hour at 50° ± 5°, then for about 3½ hours at 100° to 110° when the mass contained an amount of organically combined chlorine corresponding to about 105% of that theoretically required if the mass were dimethyldichlorosuccinate. The chlorinated mass weighed 612 parts. It was washed with aqueous sodium bicarbonate and water and then distilled in a manner as in Example 5. The distillate boiling at 118° to 130° (mostly between 119° and 122°) at 10 to 13.6 mm. mercury absolute pressure was collected as dimethyldichlorosuccinate. This collected fraction was water-white and free from malodor. It contained 34.8% chlorine and weighed 475 parts corresponding to about 79.5% of the theoretically possible yield of dimethyldichlorosuccinate.

Other lower dialkyl esters of maleic acid may be chlorinated in a manner similar to that illustrated in the foregoing examples.

Although certain preferred embodiments of the invention have been disclosed for purposes of illustration, it will be evident that various changes and modifications may be made therein without departing from the scope and spirit of the invention which is not to be limited save as defined in the appended claims.

I claim:

1. A process for converting dialkylmaleates into dialkyldichlorosuccinates by direct chlorination which comprises introducing a stream of chlorine gas in intimate contact with liquid dialkylmaleate for a sufficient length of time to effect conversion of the dialkylmaleate to the corresponding dialkyldichlorosuccinate and at a rate sufficiently high to permit a portion of the chlorine gas stream to pass unreacted into and out of the liquid dialkylmaleate undergoing chlorination thereby minimizing formation of undesired by-products.

2. A process as defined in claim 1, wherein the chlorination reaction is accelerated by the addition of a chlorinating catalyst to the dialkylmaleate.

3. A process for converting dialkylmaleates into dialkyldichlorosuccinates by direct chlorination which comprises introducing a stream of chlorine gas in intimate contact with liquid dialkylmaleate maintained at a temperature between 25° C. and 125° C. for a sufficient length of time to effect conversion of the dialkylmaleate to the corresponding dialkyldichlorosuccinate and at a rate sufficiently high to permit 5% to 10% of the chlorine gas stream to pass unreacted into and out of the liquid dialkylmaleate undergoing chlorination thereby minimizing formation of undesired by-products.

4. A process for converting dialkylmaleates into dialkyldichlorosuccinates by direct chlorination which comprises introducing a stream of chlorine gas in intimate contact with liquid dialkylmaleate maintained at a temperature between 50° C. and 100° C. until the amount of organically combined chlorine is between 95% and 110% of the amount which theoretically would be present if all the chlorinated dialkylmaleate were dialkyldichlorosuccinate, regulating the flow of chlorine gas at a rate sufficiently high to permit 5% to 10% of the chlorine gas stream to pass unreacted into and out of the liquid dialkylmaleate undergoing chlorination, and accelerating the chlorination reaction by the addition of a chlorinating catalyst to the dialkylmaleate.

5. A process for converting dialkylmaleates into dialkyldichlorosuccinates by direct chlorination which comprises introducing a stream of chlorine gas in intimate contact with liquid dialkylmaleate in which the alkyl groups each contain not more than 4 carbon atoms for sufficient length of time to effect conversion of the dialkylmaleate to the corresponding dialkyldichlorosuccinate, regulating the flow of chlorine gas at a rate sufficiently high to permit a portion of the chlorine gas stream to pass unreacted into and out of the liquid dialkylmaleate undergoing chlorination, and accelerating the chlorination reaction by the addition of a chlorinating catalyst to the dialkylmaleate.

6. A process for converting dialkylmaleates into dialkyldichlorosuccinates by direct chlorination which comprises passing chlorine gas in contact with liquid dialkylmaleate in the presence of phosphorous pentoxide as a chlorination catalyst for a sufficient length of time to effect conversion of the dialkylmaleate to the corresponding dialkyldichlorosuccinate.

7. A process for converting dialkylmaleates into dialkyldichlorosuccinates by direct chlorination which comprises passing chlorine gas in contact with liquid dialkylmaleate in the presence of elemental sulfur as a chlorination catalyst for sufficient length of time to effect conversion of the dialkylmaleate to the corresponding dialkyldichlorosuccinate.

8. A process for converting dialkylmaleates into dialkyldichlorosuccinates by direct chlorination which comprises passing chlorine gas in contact with liquid dialkylmaleate in the presence of sulfur monochloride as a chlorination catalyst for sufficient length of time to effect conversion of the dialkylmaleate to the corresponding dialkyldichlorosuccinate.

9. A process for converting dialkylmaleates to dialkyldichlorosuccinates by direct chlorination which comprises introducing a stream of chlorine gas in intimate contact with liquid dialkylmaleate in which the alkyl groups contain not more than 4 carbon atoms, maintaining the dialkylmaleate under constant agitation at a temperature between 50° C. and 100° C., continuing the introduction of chlorine until the amount of organically combined chlorine in the dialkylmaleate undergoing chlorination is between 95% and 110% of the amount which theoretically would be present if all the chlorinated dialkylmaleate were dialkyldichlorosuccinate, regulating the flow of chlorine gas at a rate sufficiently high to permit 5% to 10% of the chlorine gas to pass unreacted into and out of the liquid dialkylmaleate undergoing chlorination, and accelerating the chlorination reaction by the presence of a phosphorous pentoxide chlorinating catalyst in the reaction mass.

10. A process for converting dialkylmaleates to dialkyldichlorosuccinates by direct chlorination which comprises introducing a stream of chlorine gas in intimate contact with liquid dialkylmaleate in which the alkyl groups contain not more than 4 carbon atoms, maintaining the dialkylmaleate under constant agitation at a temperature between 50° C. and 100° C., continuing the introduction of chlorine until the amount of organically combined chlorine in the dialkylmaleate undergoing chlorination is between 95% and 110% of the amount which theoretically would be present if all the chlorinated dialkylmaleate were dialkyldichlorosuccinate, regulating the flow of chlorine gas at a rate sufficiently high to permit 5% to 10% of the chlorine gas to pass unreacted into and out of the liquid dialkylmaleate undergoing chlorination, and accelerating the chlorination reaction by the presence of a sulfur chlorinating catalyst in the reaction mass.

11. A process for converting dialkylmaleates to dialkyldichlorosuccinates by direct chlorination which comprises introducing a stream of chlorine gas in intimate contact with liquid dialkylmaleate in which the alkyl groups contain not more than 4 carbon atoms, maintaining the dialkylmaleate under constant agitation at a temperature between 50° C. and 100° C., continuing the introduction of chlorine until the amount of organically combined chlorine in the dialkylmaleate undergoing chlorination is between 95% and 110% of the amount which theoretically would be present if all the chlorinated dialkylmaleate were dialkyldichlorosuccinate, regulating the flow of chlorine gas at a rate sufficiently high to permit 5% to 10% of the chlorine gas to pass unreacted into and out of the liquid dialkylmaleate undergoing chlorination, and accelerating the chlorination reaction by the presence of a sulfur monochloride chlorinating catalyst in the reaction mass.

12. A process for the production of purified dialkyldichlorosuccinates which comprises passing chlorine gas in contact with liquid dialkylmaleate in the presence of a sulfur chlorination catalyst to produce thereby an impure dialkyldichlorosuccinate, mixing a small amount of powdered iron with the impure dialkyldichlorosuccinate, and distilling the mixture in vacuo to produce thereby distillate fraction containing dialkyldichlorosuccinate which is water-white and free from bad odor.

13. A process for the production of purified dialkyldichlorosuccinates which comprises passing chlorine gas in contact with liquid dialkylmaleate in the presence of a sulfur monochloride chlorination catalyst to produce thereby an impure dialkyldichlorosuccinate, mixing a small amount of powdered iron with the impure dialkyldichlorosuccinate, and distilling the mixture in vacuo to produce thereby a distillate fraction containing dialkyldichlorosuccinate which is water-white and free from bad odor.

14. A process for the production of purified dialkyldichlorosuccinates which comprises passing chlorine gas in contact with liquid dialkylmaleate in the presence of a sulfur chlorination catalyst to produce thereby an impure dialkyldichlorosuccinate, mixing a small amount of powdered copper with the impure dialkyldichlorosuccinate, and distilling the mixture in vacuo to produce thereby a distillate fraction containing dialkyldichlorosuccinate which is water-white and free from bad odor.

15. A process for the production of purified dialkyldichlorosuccinates which comprises passing chlorine gas in contact with liquid dialkylmaleate in the presence of a sulfur monochloride chlorination catalyst to produce thereby an impure dialkyldichlorosuccinate, mixing a small amount of powdered copper with the impure dialkyldichlorosuccinate, and distilling the mixture in vacuo to produce thereby a distillate fraction containing dialkyldichlorosuccinate which is water-white and free from bad odor.

16. A process for the production of purified dialkyldichlorosuccinates which comprises passing chlorine gas in contact with liquid dialkylmaleate in the presence of a sulfur chlorination catalyst to produce thereby an impure dialkyldichlorosuccinate, mixing the impure dialkyldichlorosuccinate with sufficient aqueous alkali metal bicarbonate to obtain an aqueous alkaline mixture, separating oily material from the alkaline mixture, washing the oily material with water until neutral, and distilling the neutral oily material in vacuo to recover a distillate fraction containing dialkyldichlorosuccinate which is water-white and free from bad odor.

17. A process for the production of purified dialkyldichlorosuccinates which comprises passing chlorine gas in contact with liquid dialkylmaleate in the presence of a sulfur monochloride chlorination catalyst to produce thereby an impure dialkyldichlorosuccinate, mixing the impure dialkyldichlorosuccinate with sufficient aqueous alkali-metal bicarbonate to obtain an aqueous alkaline mixture, separating oily material from the alkaline mixture, washing the oily material with water until neutral, and distilling the neutral oily material in vacuo to recover a distillate fraction containing dialkyldichlorosuccinate which is water-white and free from bad odor.

J. OSBORN ASHCRAFT.

REFERENCES CITED

The following references are of record in the file of this patent:

Terry et al., Jour. Am. Chem. Soc. 47, pages 1067–1077 (1925).